United States Patent [19]
Fini, Jr.

[11] Patent Number: 5,501,304
[45] Date of Patent: Mar. 26, 1996

[54] BAND BRAKE HOLDER/LEVER

[76] Inventor: Anthony W. Fini, Jr., 4273 Mundy St., Blasdell, N.Y. 14219

[21] Appl. No.: 434,581

[22] Filed: May 1, 1995

Related U.S. Application Data

[62] Division of Ser. No. 252,890, Jun. 2, 1994, abandoned.
[51] Int. Cl.$^6$ ............................................. F16D 51/02
[52] U.S. Cl. .................... 188/77 W; 188/250 H; 188/259
[58] Field of Search .................... 74/376, 378, 379, 74/142; 192/48.91, 67 R, 80, 54; 188/77 W, 77 R, 249, 250 H, 259

[56] References Cited

U.S. PATENT DOCUMENTS 3,863,738  2/1975  Molloy .................... 188/77 R
3,907,075  9/1975  Christison et al. .................... 188/77 W
4,778,036  10/1988  Nowak .................... 188/77 R

*Primary Examiner*—Robert J. Oberleitner
*Assistant Examiner*—Chris Schwartz

[57] ABSTRACT

The invention is a device which holds a brake band and provides a simple levered actuating force. One end of the band of a brake is mounted to a U-shaped bracket. Slots are provided for the U-shaped bracket so that a lever, which connects to the opposite end of the brake band, can pivot on the bottoms of the slots and pull the brake band tightly around the brake drum and so providing a powerful brake.

5 Claims, 1 Drawing Sheet

BAND BRAKE HOLDER/LEVER

This application is a division of U.S. Ser. No. 08/252,890, filed Jun. 2, 1994, now abandoned.

BACKGROUND OF THE INVENTION

The invention is a device which holds the band of a band brake while also providing a simple lever mechanism to actuate the band brake.

Band brakes are popularly used in minibikes, garden tractors and a variety of small engine powered equipment such as sports vehicles including all terrain vehicles (ATV's), go karts and the like. In order to retain simplicity and reduce expense a simple cable and a hand or foot lever is commonly used to actuate them. However, a mounting means for the band is still needed and the brake actuation force is limited by the strength of the cable and cable retainer ends.

SUMMARY OF THE INVENTION

The invention provides a holder for the band of the band brake and also provides a simple and powerful mechanical lever to actuate the brake. A cable or rod actuated by a pedal or hand lever can still be used with the invention. Also with this device, three times the braking force usually obtained on a same size brake is easily possible. In addition, an extension can be mounted to the brake lever so that the need for an additional cable or linkage rod can in some usage situations be eliminated.

DETAILED DESCRIPTION OF THE INVENTION

Figure 1:
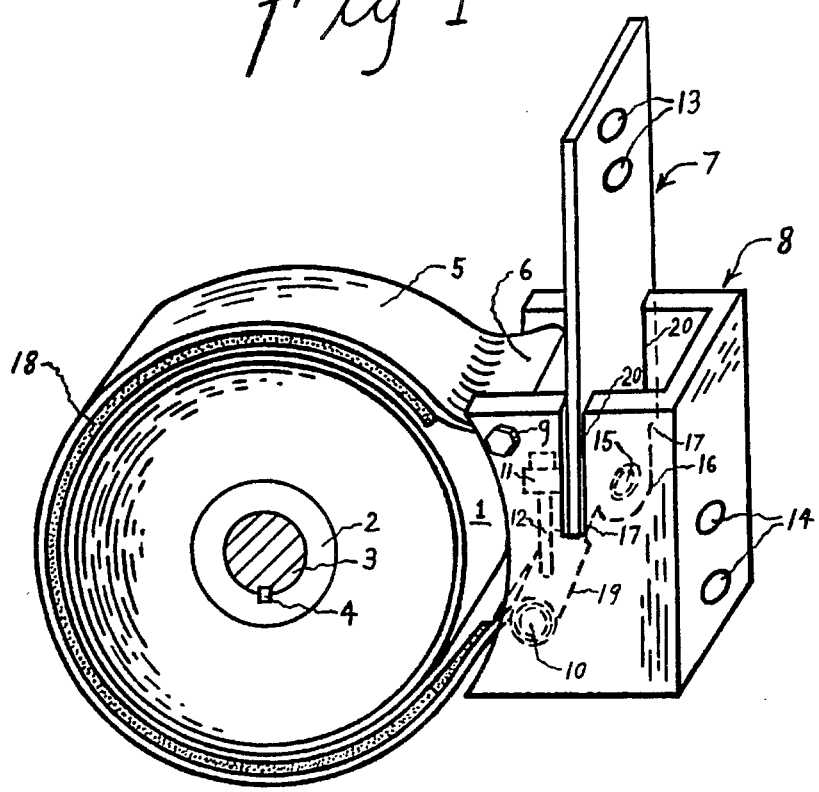
FIG. 1 is a pictorial view illustrating the complete brake assembly.

FIG. 1 shows the brake drum 1 which includes a hub 2 mounted on a driven shaft 3. A key 4 is provided to secure the brake drum 1 to the shaft 3. One curled end 6 of a brake band 5 with lining 18 is mounted between opposing legs of a U-shaped bracket 8 by a bolt 9 which passes through one leg of the U-shaped bracket 8, through the curled end 6 of the brake band 5 and threads into the opposite leg of the U-shaped bracket 8. Slots 20 are arranged in opposite legs of the U-shaped bracket 8 and are sized to receive a lever plate 7. The lever plate 7 has a rounded end 16 and flat shoulders 17. A stud 11 is rotatably mounted and passes through a hole 15 in the rounded end 16 of the lever plate 7. A socket cap screw 12, which is preferably hardened, is placed in a hole through the stud 11 forming an angled linkage. A pin 10 passes through the opposite curled end 19 of the brake band 5. The cap screw 12 passes perpendicularly through the opposite curled end 19 and is threaded into the pin 10 so that this opposite curled end 19 is connected to the lever plate 7 and can also be between opposing legs of the U-shaped bracket 8. This opposite curled end 19 of the brake band 5 holds the lever plate 7 within the slots 20 of the U-shaped bracket 8. The lever plates rounded end 16 extends beyond the bottoms of the slots 20 and prevents movement of the lever plate 7 on the bottom of a slot 20 when the lever plate is pivotally moved.

Figure 2:
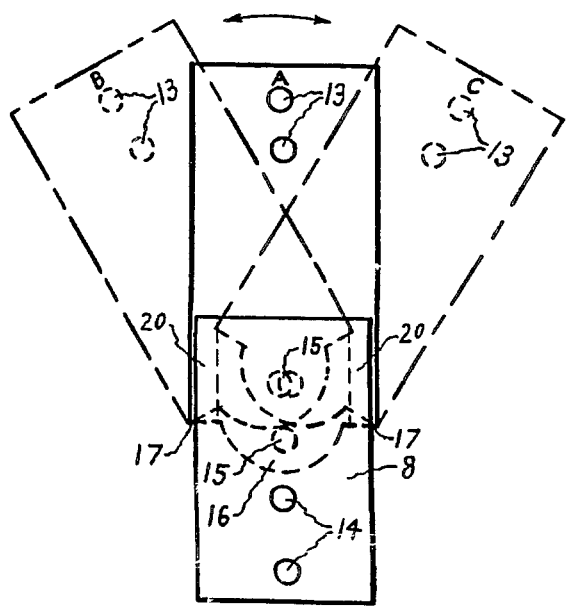
FIG. 2 is a partial side view illustrating the lever mechanism at rest (A), and in phantom (B,C) at alternate positions of tension.

In operation, the U-shaped bracket 8 is mounted at its base to a suitable framework with provided mounting holes 14. In FIG. 1 and FIG. 2 (A) the holder/lever is shown in a non-braking position so that the brake drum 1 with the driven shaft 3 are free to rotate. Mounting holes 13 are provided on the lever plate 7 so that a cable, linkage rod, or even an extension with a handle can be mounted to the lever plate 7 so that a push or pull force on the lever plate 7 causes it to move within the slots 20 of the U-shaped bracket 8. In FIG. 2 (B and C) it can be seen that when this movement occurs the lever plate 7 pivots on either of its shoulders 17 and the rounded end 16 with its hole 15 is raised thereby tightening the lined band 5 of the band brake around its drum 1 slowing or stopping the driven shaft 3. The socket cap screw 12 being threaded into the band brake pin 10 provides adjustment so that the band 5 can be kept close to its drum 1 and little movement of the lever plate 7 is needed to actuate the brake.

During testing of the device, it was found that it works very well and a 4 inch (10.16 centimeters) diameter band brake having a 1 inch (2.54 centimeters) wide band stopped over 180 lbs.-ft. (244 neuton-meters) of shaft torque.

What is claimed is:

1. A band brake assembly comprising:
   a brake drum, mounted to a shaft and rotatable with said shaft;
   a bracket mounted adjacent said brake drum having generally; parallel spaced legs interconnected by a base and opposed slots in said legs;
   a brake band arranged around said brake drum and means for mounting one end of said brake band;
   a lever member sized for said opposed slot and mounted in said opposed slots, means for connecting the opposite end of said brake band to said lever member between said generally parallel spaced legs, and means for preventing movement of said lever member on the bottom of one of said slots when said lever member is pivotally moved so that when force is applied to said lever member said lever member pivots on the bottom of said one of said slots and pulls said brake band around said brake drum whereby the rotation of said brake drum is opposed.

2. The brake assembly of claim 1, wherein said brake drum is 4 inches (10.16 centimeters) in diameter, said brake band is 1 inch (2.54 centimeters) wide, and said brake assembly stops over 180 lbs.-ft. (244 neuton-meters) of torque from said shaft.

3. The brake assembly of claim 1, wherein said bracket is U-shaped and wherein said brake band one end is curled and mounted between the legs of said U-shaped bracket by a bolt passing through one of said legs of said U-shaped bracket, said bolt passing through said curled end, and said bolt is threaded into the opposite leg of said U-shaped bracket so that said brake band curled end is held by said bolt between the legs of said U-shaped bracket.

4. The brake assembly of claim 1, wherein said lever member comprises a rectangular plate having a rounded extension at an end which extends beyond the bottoms of said slots so that said lever plate pulls said brake band around said brake drum when said lever plate pivots on the bottoms of either of said slots and either a push or pull force to said lever plate slows or stops the rotation of said shaft.

5. The brake assembly of claim 1, wherein the means for connecting said opposite end of said brake band to said lever member comprises a stud rotatably mounted through a hole in said lever member, said opposite end of said brake band has a curled end with a pin passing through said curled end, a cap screw passes through the end of said stud forming an angled linkage, said cap screw perpendicularly passes through said curled end and threads into said pin so that said opposite end of said brake band and said lever member are connected by said cap screw and the distance said cap screw threads into said pin increases or decreases the looseness of said brake band around said brake drum.

* * * * *